April 5, 1960 — R. H. OSTERGREN ET AL — 2,931,910
AUTOMATIC STAR TRACKER
Filed March 14, 1949 — 3 Sheets-Sheet 3
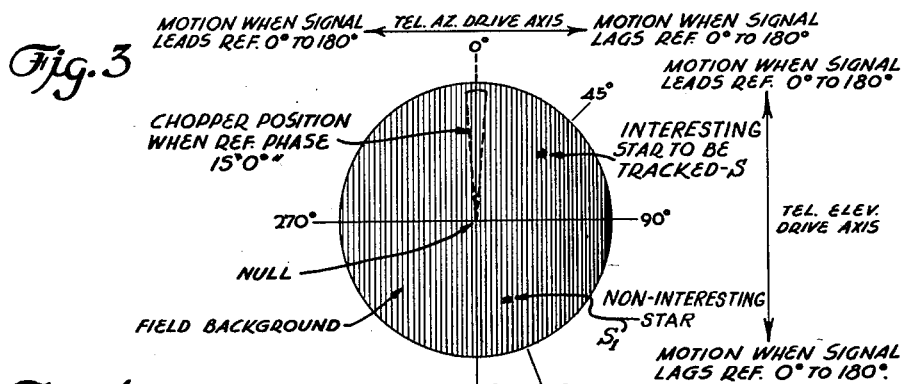
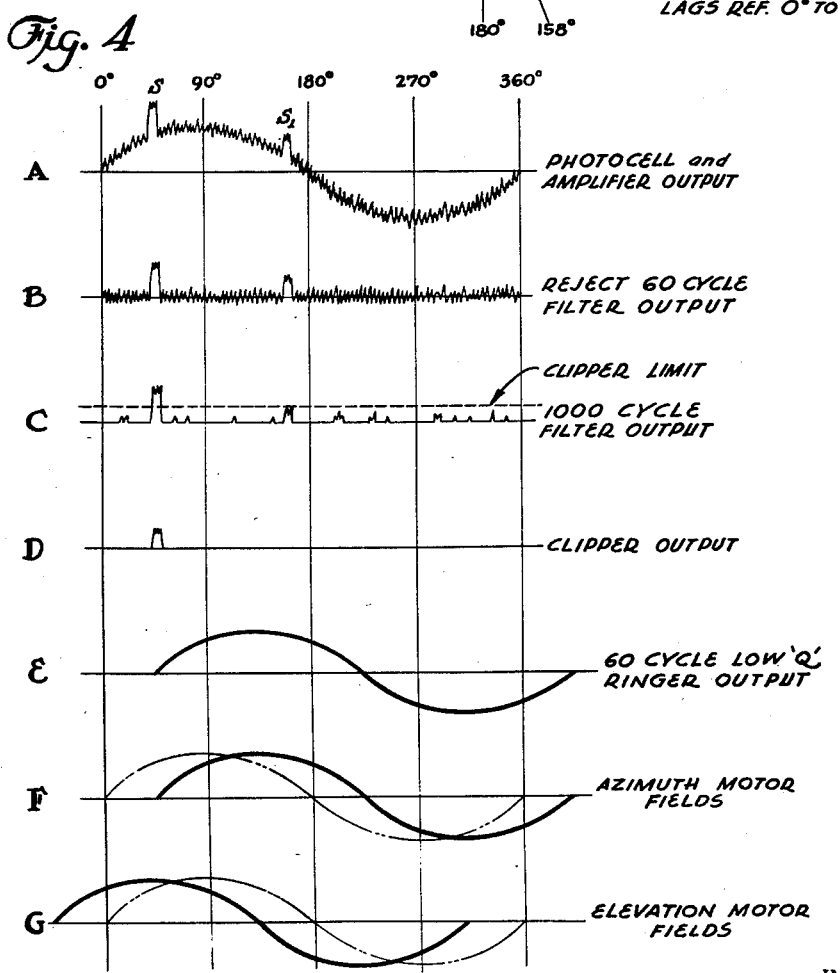
INVENTORS
RALPH H. OSTERGREN
LEONARD L. NALLEY
BY
ATTORNEY

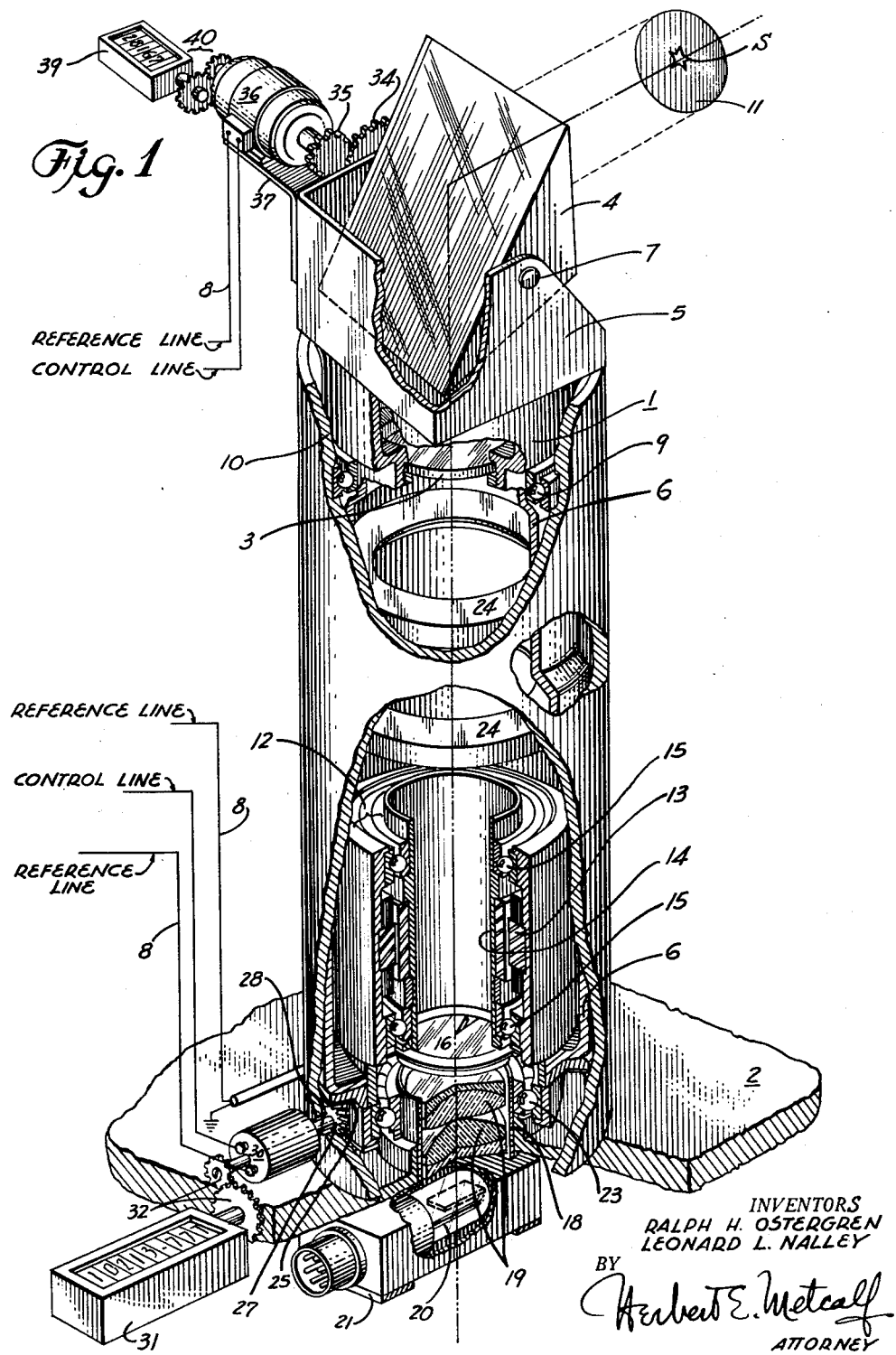

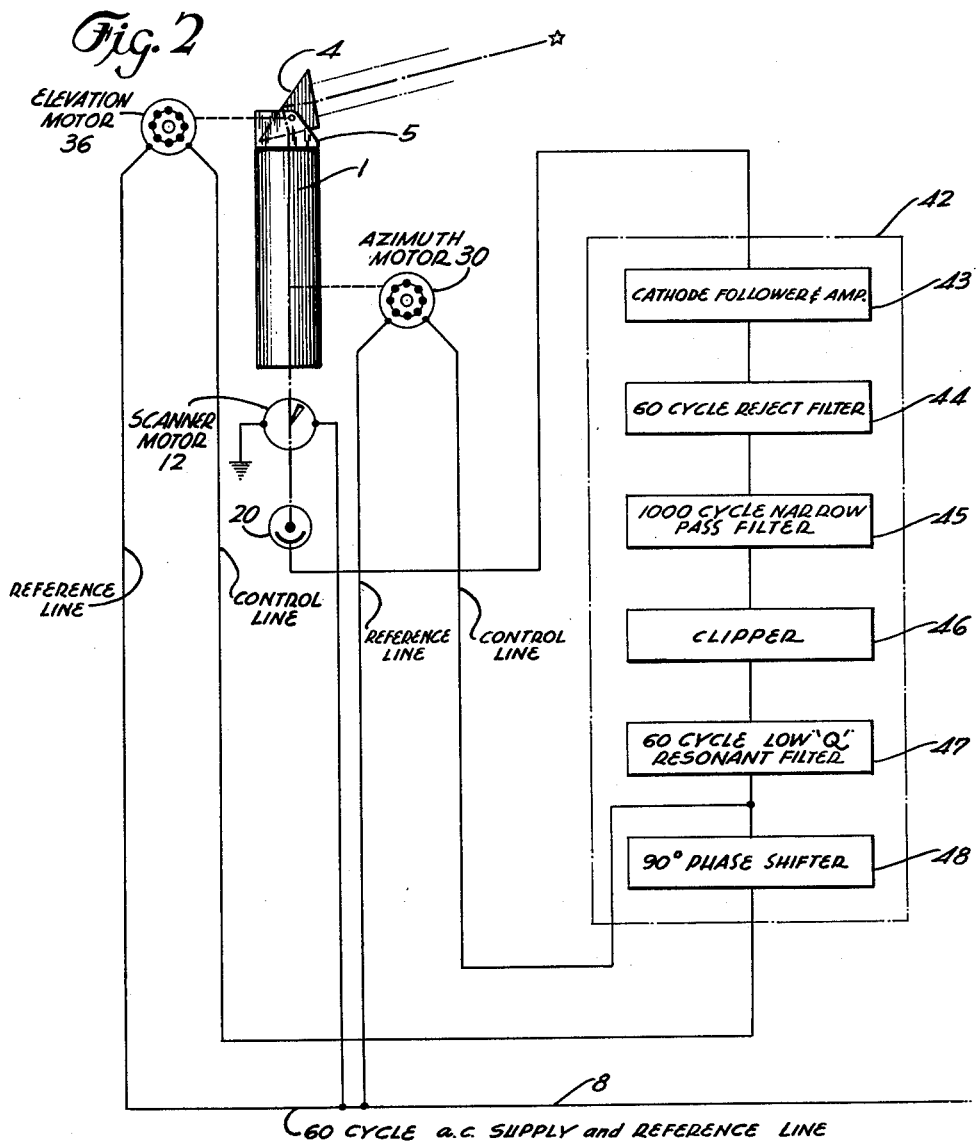

United States Patent Office 2,931,910
Patented Apr. 5, 1960

2,931,910

AUTOMATIC STAR TRACKER

Ralph H. Ostergren, Los Angeles, and Leonard L. Nalley, Compton, Calif., assignors to Northrop Corporation, a corporation of California Application March 14, 1949, Serial No. 81,222

17 Claims. (Cl. 250—203)

This invention relates to radiant source trackers, and more specifically to a means and method of automatic star tracking for preventing erroneous results.

In radiant source trackers such as star tracking systems it is desirable to automatically track a star in such a manner that a usable intelligence can be derived, consisting of the measured or tracked star elevation with respect to some known reference plane established by the tracking means; and the measured or tracked star azimuth as indicated by the relation of the line of bearing of the star in the reference plane with respect to some known reference such as the direction of magnetic north.

This intelligence can be used to establish a relationship in space between the tracking means and the selected star as a part of essential information required to perform automatic celestial navigation or in any other manner where an instantaneous or continual reference to one of the heavenly bodies is required.

In accordance with the invention, an optical system constituting some form of telescope having a restricted field of view brings all light within the area of the sky, defined by that field, to focus on the focal plane. An interested star image appears at the focal plane as a point source of light (since all received rays from the star are essentially parallel) of small but finite size dependent upon the character and accuracy of the optics. Further, the light in the field from the adjacent sky, reflections from haze (which may be due to light sources in or out of the field) and the light from fainter stars in the field is also incident on the focal plane.

It is hence desirable that a suitable sensing means be provided which will discriminate between the focused light of the interesting star image and all other light in such a manner that the focused star light will provide the basis for elevation and azimuth error signals needed by an associated null seeking servo system for tracking the star.

The broad purpose of this invention is to provide scanning means and a control network for a star tracker which filters out spurious error signals. Pursuant to this purpose, the more specific objects of this invention are:

(a) To provide a means and method of error detecting which eliminates spurious error signals due to background light.

(b) To provide means of error detecting whereby spurious error signals caused by other non-interesting point-light sources, such as another star in the field, are eliminated.

(c) To provide means of error detecting whereby critical optical alignment of the components is not necessary.

(d) To provide means of error detecting whereby uniformity of photocell cathode area is not required.

(e) To provide a servo control network wherein a better signal wave form is fed to the control motors resulting in more power and less overheating.

Broadly stated, this invention comprises an optical means for perceiving and focusing energy radiating from an interesting point source object which is desired to be tracked. Other radiating energy in the field adjacent to the interesting object is also picked up by the optical means. Therefore, after modulating all the focused energy into periodic signals by a suitable scanning means located in the focal plane of the optical means, a discriminating circuit is provided which separates the interesting object signal from all other of the periodic signals. Means are then provided for orientating the tracker, in accordance with only the interesting object, to keep the optical means focused on the interesting point source object.

In more specific terms, this invention comprises an optical means for perceiving and focusing an image of an interesting star and its adjacent field at the focal plane where a scanning means modulates all this light into periodic light pulses synchronous with a reference frequency that is identical to scanner rotation. The phase relationship between the interesting star pulses and the reference frequency indicates the direction of the star image from the center of the field of view of the optical means as defined by the intersection of the optic axis with the focal plane. A light sensitive element passes all the light pulses as electrical energy into a suitable servo network of filtering, amplification, and phase shifting which segregates the interesting star pulses from all other of the pulses and converts the existing phase relationship between the interesting star pulses and the reference into usable component potentials used by an azimuth drive and an elevation drive to drive the optical means in such a manner as to return the interesting star image to the optic axis in the field of view at the focal plane. The intersection of the optic axis with the focal plane thus becomes the null position at which the optical means is maintained by the null seeking servo system and tracking of the selected star becomes a continuous operation. The measurable angle of the optical means to its supporting table as established by the driving motors constitutes the derived intelligence of the star's elevation with respect to the table. Moreover, azimuthal intelligence is derived by indexing against the line of bearing of the selected star. This continuously derived intelligence can be sensed by other systems and used for astronomical or navigational purposes.

The attached drawings illustrate the preferred embodiment and theory of operation of the invention. It is to be expressly understood, however, that the drawings are for the purpose of illustration only and are not designed as a definition of the limits of the invention, reference being had to the appended claims for that purpose.

In the drawings:

Figure 1 is a perspective view, partly in section, of a novel structure embodying the present invention.

Figure 2 is a control signal network for the embodiment of the invention in Figure 1.

Figure 3 is a view of the focused field of the optical means.

Figure 4 is a chart tracing the history of the signal picked up by the optical means.

Referring to Figure 1, a telescope 1 is positioned with its optic axis preferably fixed normal to a gyrostabilized table 2. Telescope 1, containing an aplanatic objective lens 3, receives light from an interesting star S and its surrounding field 11 by means of a total reflecting prism 4 facing directly at the star S. Prism 4 has two 35° angles and is mirrored on its back side. A suitable bracket 5, rigidly secured to the top of telescope barrel 6, supports prism 4 on a horizontal axis by means of trunnions 7, thus enabling the prism 4 to be rotated to track the star S in elevation.

Telescope barrel 6 is supported near its upper end on bearing 9 which holds the telescope 1 in the vertical position in a cylindrical housing 10 which is integral with and positioned normal to the gyrostabilized table 2.

Concentrically positioned inside the lower portion of telescope barrel 6 is a scanner motor 12 comprised of a stator 13 fixed to the inner wall of the telescope barrel 6 and a hollow shaft rotor 14 rotating in bearings 15. The hollow shaft rotor 14 permits passage of light from the telescope field 11 and at the same time helps shield the focal plane from random light by acting as an effective baffle. Attached to the lower end of the rotor 14, to rotate therewith, and lying in the focal plane of the telescope 1 is a scanner disc 16. The surface of scanner disc 16 is opaque except for a 10° wedge having its apex at the center of rotation of the disc located at the null position of the field. The scanner disc 16 modulates the incident light into light pulses having a repetition rate equal to the rotation of synchronously driven scanner motor 12 which is energized by a reference frequency in reference frequency lead 8. Positioned concentrically with the cylindrical housing 10 and rigidly secured below the gyrostabilized table 2 is a cylindrical bracket 18 which holds on a reduced diameter on its upper end thereof a set of achromatic collimating lenses 19. Lenses 19 receive the modulated light signal from scanner disc 16 and direct the signal onto the cathode of photocell 20 which is mounted directly below lenses 19 on a photocell bracket 21 attached below the table 2. The lower end of telescope barrel 6 seats bearing 23 by which it is mounted onto cylindrical bracket 18.

Baffles 24 are arranged within the telescope barrel 6 in such a manner as to shield the focal plane from most of the random light entering the telescope from sources other than the field of view 11.

Near the lower end of the telescope barrel 6 encircling the outer periphery thereof a bevel gear 25 is attached. Gear 25 meshes with a drive gear 27 on shaft 28 extending through the side wall of cylindrical housing 10 and driven by an azimuth motor 30.

An azimuth counter 31 is attached to the shaft of azimuth motor 30 through reduction gearing 32. Azimuth counter 31 gives a continuous indication of the measured or tracked star azimuth as indicated by the relation of the line of bearing of the star in the plane of the gyrostabilized platform 2 with respect to some known reference, e. g., the direction of magnetic north.

Prism trunnion 7 has a step-down gear 34 attached to its outer end which meshes with a drive gear 35 driven by an elevation motor 36. Elevation motor 36 is supported by a platform 37 secured to prism bracket 5.

Elevation motor 36 also has a similar counter 39 attached to be driven by reduction gears 40. Elevation counter 39 continuously indicates the measured or tracked star elevation with respect to the gyrostabilized platform 2.

The preferred servo system, in accordance with this invention, for a tracker such as illustrated in Figure 1, by way of example and not limitation, is shown in Figure 2 and includes the servo control signal network 42, the azimuth motor 30, the elevation motor 36, and supply line 8 supplying the reference fields of these motors and power to the scanner motor 12. The control signal network consists of a cathode follower and amplifier 43, a 60 cycle reject filter 44, a 1000 cycle narrow pass filter 45, a clipper 46, a 60 cycle resonant filter (called a ringer) 47, and a phase shifter 48.

In order to fully understand the theory of the preferred servo control signal network 42 of the present invention, the nature of the possible spurious signals due to the light in the field of view of the telescope 1 will be discussed.

In general, the light pattern of the field of view of the optical means employed in a star tracker consists of a distinguishable star image located in the field in accordance with the azimuth and elevation settings of the telescope directed to the star, as well as a background light from other sources which may be uniform or nonuniform.

A suitable photocell, placed in such a position that the light incident on the focal plane will fall on its cathode, converts that light into electrical energy directly related to the amount of light energy received. The photocell has no means of discriminating, however, and so the light received by it is modulated in some manner to provide qualitative intelligence for the photocell's output signals. This modulation is accomplished, in accordance with this invention, by a shutter arrangement between the focal plane and the photocell which is able to scan adjacent finite sections of the field of view in sequence. Each finite section has a photocell signal output characteristic of the light in that section. A complete scanning sequence from a known starting point through succeeding adjacent sections around the field and back to the starting position causes a cyclic signal output of the photocell that is qualitatively characteristic of the particular field scanned as a function of shutter position. By either providing or identifying the cyclic rate of the shutter with an electrical reference potential, the photocell signal is qualitatively characteristic of the field as a function of phase angle.

The three major component signals picked up by the photocell include spurious signals such as background light which, in general, is composed of light due to background whether gradient or uniform, and effects due to mechanical and optical misalignments, reflections, etc. These spurious signals are characterized by a frequency identical to that of the scanner. The component signal of the interested star is characterized by a square wave pattern while the signal of other local light sources, such as another star, is characterized also by a square wave of lower amplitude. Other local effects such as optical aberrations, are assumed to be nullified by proper selection of the optical system, photocell characteristics, etc.

From the above, it is apparent that the wave frequency of the star image signal pulse is the same as that of the spurious signals and, therefore, discrimination on this basis is impractical. Discrimination on the basis of amplitude (due to intensity of light) is made difficult by the fact that in any general case the background can be of any and variable amplitude and the system is apt to home on the gradient or track in some centroidal manner. A scanner design which permits positive discrimination between the star pulse and accompanying spurious signals consists of scanner disc 16 which is all opaque except for a 10° wedge having its apex at the center of rotation of the scanner located at the null position of this field. Using scanner disc 16, the background spurious signal is characterized by a frequency equal to scanner rotation since it requires a complete scanner revolution to derive the wave form. The desired star image pulse, however, is of a much shorter duration and will consequently be characterized by a wave form of higher frequency with a repetition rate equal to scanner rotation frequency.

This pulse, being essentially of square wave form, is composed of harmonic components in accordance with a Fourier series. The pulse from another, non-interesting star in the field is similarly generated but of notably smaller amplitude. Practical discrimination of the interesting star image signal over all other signals on the basis of frequency filtering is now possible. By using scanner disc 16 with a 10° wedge, rotating at 60 c.p.s., the difference in signal characteristics is readily apparent. The background spurious signal remains a signal with the same frequency as the scanner disc 16 since its development depends on a complete revolution of the scanner. Its repetition rate is also 60 c.p.s. The interesting star image generates a pulse which may be considered as a complex wave of a series of higher frequency harmonics occurring with a repetition rate of 60 c.p.s. Although the repetition rate of the desired star pulse is equal to the repetition rate of the background and both are equal to background frequency, the important component frequencies of the star pulse lie about $$\tfrac{1}{2} \times 60 \times \tfrac{360}{10} = 1080 \text{ c.p.s.}$$

based on the formula $$\frac{\text{reference frequency}}{2} \times \frac{360°}{\text{sector angle}}$$

Thus, a filter of high pass characteristics is used which passes the higher component signals due to star light but rejects spurious signals due to background light at 60 c.p.s.

The signals from a fainter non-interesting star in the field are passed at a lower amplitude, which can be properly clipped, so that it can be said that the interesting star signal is passed substantially free of spurious effects. The phase relationship of this signal to the reference line is qualitative of star position in the field and is thus used in a suitable null seeking servo system to control the telescope position.

Signals derived from the photocell 20, in addition to those resulting from scanning, include high frequency effects due to photocell dark current, random signals due to instability of the tube, the effect of stray ions or electrons, and variations due to cathode non-uniformity. In general, these are of high frequency noise producing characteristics which are easily filtered, are of such low amplitude that they are ineffective, or are of such random nature as to leave the resonance due to the star pulse undisturbed in the servo system.

Optical errors, eccentricities in the mechanism, misalignments and adjustments result, in general, in a cyclic hum of scanner frequency and is filtered out of the servo signal directly. Other spurious signals of a local nature are either reducible to amplitude which will not unbalance the resonant output of the servo or are clipped.

Operation of the null seeking servo system, in view of the above discussion, may be seen by referring to Figures 2, 3 and 4. The assumed field of view is shown in Figure 3 to include an interesting star S to be tracked, a fainter spurious star $S_1$, and a gradient background light that is brightest at a reference phase angle of 90° and dimmest at 270°. The servo system has been designed to provide a coordinate system with the sign conventions of reference phase angle, scanner disc position, and drive control as shown. Figure 4, in conjunction with Figure 2, traces the history of the servo signal from the photocell 20 output to the azimuth and elevation control motors 30, 36 respectively. The photocell output is a feeble high impedance signal and is fed directly into a cathode follower 43 whose output, as shown in curve A of Figure 4, is a low impedance amplified signal with the same characteristics of the original photocell signal. This reduces the electrostatic and electromagnetic effects due to other circuits in the vicinity to inconsequence and permits the remaining components of the system to be located at some isolated area so that the entire mass of the system need not be swung by the servo motors. The signal is next passed through a 60 cycle reject filter 44 to remove the cyclic background effect due to gradient, misalignments, etc., caused by the 60 c.p.s. chopper rotation. The output of this filter, shown in curve B, will then contain the desired and spurious star pulses and photocell noise pulses. The 1000 cycle filter 45 passes the important harmonic components of the star pulses but there is a detectable difference in amplitude between the desired and spurious star pulses, as shown in curve C. Also, most of the photocell noise has been filtered except for that falling within the range of this filter which is generally of feeble character except for occasional random noise pulses of higher amplitude. The clipper 46 further isolates the desired star pulse, as shown by curve D, by passing pulses only above a certain amplitude. Thus, the spurious star pulse can be eliminated and only the desired star pulse plus whatever random noise pulses are still within the range of the clipper are passed. The signal is now passed into the 60 cycle low "Q" resonant filter 47 to recreate a 60 cycle signal (see curve E) based on the phase position of the star pulse, to be used in the drive motor control fields. The predominant 60 cycle star pulse frequency causes this filter to resonate at the desired phase angle. Spurious pulses still present can cause an amplitude and phase shimmer of this recreated wave but the random nature of these pulses cannot cause the ringer 47 to respond over the constant beat at 60 cycles due to the star pulse, and so adequate signal intelligence is established.

It is thus seen that if the photocell signal is filtered to pass the component signal of the interesting star image only, while the background and local spurious signals are either removed or reduced to ineffectiveness or not even registered by properly selecting the photocell, then a usable star signal is available to control a servo system driving the telescope, provided that a phase relationship is established between the signal and the driving motors.

In accordance with this invention, this phase relationship is established by synchronously driven scanner disc 16 maintaining a phase angle that is typical of its angular position in the field with respect to any arbitrarily selected coordinate system of the field. The reference fields of the two-phase motors 36, 30 driving the telescope 1 about these coordinate axes and the scanner motor 12 are referenced to each other by a common line which, in the case illustrated, is also the A.C. power supply line 8 so that the servo system receives positive position control signals from the interested star pulse based on star image position with respect to the selected axis.

Referring back to Figure 4, the 60 cycle output signal from the ringer 47, as shown by the solid curve F, is thus fed directly to the control field of azimuth drive motor 30. A parallel circuit from the ringer 47 feeds the 60 cycle output signal to a 90° phase shifter 48 before feeding it to the control field of the elevation motor 36. The solid curve G shows this elevation signal shifted 90° to the azimuth signal in curve F. The dashed curves F and G represent the 60 cycle reference frequency impressed on the reference fields of the control motors 30 and 36. The response of the two-phase balancing control motors, as determined by the selected conventions shown in Figure 3, will thus drive the telescope and prism until the star image reaches null.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A star tracker comprising an optical means for perceiving and focusing the light from an interesting star and its adjacent field containing stars of lesser magnitude, a source of reference frequency, scanning means for modulating said focused light into periodic light signals in accordance with said reference frequency, a photocell for converting said periodic light signals into electrical signals, a clipper connected to pass only the higher amplitude electrical signal of said interesting star, and means for orientating said optical means in accordance with the phase relation of said interesting star signal to said reference frequency.

2. A star tracker comprising an optical means for receiving and focusing the light from an interesting star and its adjacent field containing stars of lesser magnitude onto a focal plane, a source of reference frequency, a scanner disc lying in said focal plane and positioned with the center thereof intersected by the optic axis of said optical means, driving means connected to rotate said scanner disc at said reference frequency, the surface of said scanner disc having a relatively small sector apexed at said disc center for modulating said focused light into periodic light signals having said reference frequency and having a width directly proportional to the apex angle of said sector, a photocell for converting said periodic light signals from said sector into electrical signals, a reference frequency reject filter connected to filter out any gradient wave in said photocell, a clipper for passing only the higher amplitude electrical signal of said interesting star, and means for orientating said optical means in accordance with the phase relation of said interesting star signal to said reference frequency.

3. A star tracker comprising an optical means having a restricted field of view, a mount adapted for orientating said optical means in azimuth and elevation, said optical means focusing all the light within said field of view onto a focal plane, which light may consist of a field light gradient, an interesting star, a fainter uninteresting star, and other spurious background light, a source of 60 cycle reference frequency, a scanner disc lying in said focal plane and positioned with the center thereof intersected by the optic axis of said optical means, a hollow shaft scanner motor rotating said scanner disc at said reference frequency, the surface of said scanner disc being opaque except for a 10° sector having its apex at the center of rotation of said disc, said center locating the null position of said field, said scanner disc modulating said focused light, said light gradient being thereby modulated into a 60 cycle gradient light wave, said star lights being thereby modulated into periodic light pulses recurring at said reference frequency but with their important components at a frequency of about 1000 c.p.s., said other spurious background light being thereby modulated into periodic light pulses recurring at said reference frequency but with important components at other than 1000 c.p.s., the phase angle of said star light pulses in the period of said reference frequency thereby being a function of the direction of said star light from the center of said scanner disc, a photocell for converting said modulated light into electrical energy with the same characteristics, an amplifier, a 60 cycle reject filter for filtering out said gradient wave, a 1000 cycle narrow pass filter for filtering out the spurious background components except the star components, a clipper for passing only the higher amplitude signal of the interesting star, a 60 cycle resonant filter for recreating a 60 cycle control wave based on the phase position of said interesting star signal, an azimuth servo motor, an elevation servo motor, the reference fields of said motors impressed with said 60 cycle reference frequency, said control wave being impressed on the control field of said azimuth servo motor, a 90° phase shifter for said control wave, said phase-shifted control wave being impressed on the control field of said elevation servo motor, said servo motors connected to said mount for orientating said optical means in azimuth and elevation so as to return said interesting star to the center of said field of view.

4. A star tracker comprising an optical means having a restricted field of view, a mount adapted for orientating said optical means in azimuth and elevation, said optical means focusing all the light within said field of view onto a focal plane, which light may consist of a field light gradient, an interesting star, a fainter uninteresting star, and other spurious background light, a source of reference frequency, a scanner disc lying in said focal plane and positioned with the center thereof intersected by the optic axis of said optical means, a hollow shaft scanner motor rotating said scanner disc at said reference frequency, the surface of said scanner disc being opaque except for a sector less than 180° having its apex at the center of rotation of said disc, said center locating the null position of said field, said scanner disc modulating said focused light, said light gradient being thereby modulated into a reference frequency gradient light wave, said star lights being thereby modulated into periodic light pulses recurring at said reference frequency but with their important components at a frequency greater than said reference frequency in accordance with the arc of said sector, said other spurious background light being thereby modulated into periodic light pulses recurring at said reference frequency but with important components at other than the frequency of the important components of the light pulses of said star lights, a photocell for converting said modulated light into electrical signals with the same characteristics, a reference frequency reject filter for filtering out the gradient wave in said signals, a narrow pass filter for filtering out the spurious background components except the star components, a clipper for passing only the higher amplitude signal of the interesting star, a reference frequency resonant filter for recreating a reference frequency control wave based on the phase position of said interesting star signal with respect to said reference frequency, an azimuth servo motor, an elevation servo motor, the reference fields of both of said motors being impressed with said reference frequency, said control wave being impressed on the control field of said azimuth servo motor, a 90° phase shifter for said control wave, said phase shifted control wave being impressed on the control field of said elevation servo motor, said servo motors connected to said mount for orientating said optical means in azimuth and elevation so as to return said interesting star to said control point.

5. A star tracker comprising an optical means having a restricted field of view, a mount adapted for orientating said optical means in azimuth and elevation, said optical means focusing all the light within said field of view onto a focal plane, which light may consist of a field light gradient, an interesting star, a fainter uninteresting star, and other spurious background light, a source of reference frequency, a scanner disc lying in said focal plane and positioned with the center thereof intersected by the optic axis of said optical means, a hollow shaft scanner motor rotating said scanner disc at said reference frequency, the surface of said scanner disc being opaque except for a relatively small sector having its apex at the center of rotation of said disc, said center locating the null position of said field, said scanner disc modulating said focused light, said light gradient being thereby modulated into a reference frequency gradient light wave, said star lights being thereby modulated into periodic light pulses recurring at said reference frequency but with their important components at a frequency greater than said reference frequency in accordance with the arc of said sector, said other spurious background light being thereby modulated into periodic light pulses recurring at said reference frequency but with important components at other than the frequency of the periodic light pulses of said star lights, the phase angle of said star light pulses in the period of said reference frequency thereby being a function of the direction of said star light from the center of said scanner disc, a photocell for converting said modulated light into electrical energy with the same characteristics, an amplifier, a reference frequency reject filter for filtering out said gradient wave, a narrow pass filter for filtering out the spurious background components except the sar components, a clipper for passing only the higher amplitude signal of the interesting star, a reference frequency resonant filter for recreating a reference frequency control wave based on the phase position of said interesting star signal, an azimuth servo motor, an elevation servo motor, the reference fields of said motors impressed with said reference frequency, said control wave being impressed on the control field of said azimuth servo motor, a 90° phase shifter for said control wave, said phase shifted control wave being impressed on the control field of said elevation servo motor, said servo motors connected to said mount for orientating said optical means in azimuth and elevation so as to return said interesting star to said control point.

6. In a star tracker, means for discriminating between stars of different magnitude in the same field comprising an optical means having a restricted field of view, said optical means focusing all the light within said field of view onto a focal plane, which light may consist of an interesting star and a fainter uninteresting star, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals to provide electrical signal pulses of different amplitude caused by said stars and spaced at reference frequency, and an amplitude clipper connected to remove the uninteresting star pulse of lesser amplitude to leave an electrical signal pulse created by said interesting star.

7. In a star tracker, means for discriminating between stars of different magnitude in the same field comprising an optical means having a restricted field of view, said optical means focusing all the light within said field of view onto a focal plane, which light may consist of an interesting star and a fainter uninteresting star, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals to provide electrical signal pulses of different amplitude caused by said stars and spaced at reference frequency, an amplitude clipper connected to remove the uninteresting star pulse of lesser amplitude to leave an electrical signal pulse created by said interesting star, a ringer circuit of reference frequency output connected to be triggered by said interesting star pulse, and means for comparing the phase of said ringer circuit output with the phase of said reference frequency to determine the direction of departure of the image of said interesting star from the center of said scanner disc.

8. In a star tracker, means for discriminating between stars of different magnitude in the same field comprising an optical means having a restricted field of view, said optical means focusing all the light within said field of view onto a focal plane, which light may consist of an interesting star and a fainter uninteresting star, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals to provide electrical signal pulses of different amplitude caused by said stars and spaced at reference frequency, an amplitude clipper connected to remove the uninteresting star pulse of lesser amplitude to leave an electrical signal pulse created by said interesting star, a ringer circuit of reference frequency output connected to be triggered by said interesting star pulse to create a reference frequency control signal, a motor having a reference field connected to said source of reference frequency, and having a control field connected to receive said control signal, said motor being connected to move said optical means to return the image of said interesting star to the center of said scanner disc, when a phase difference between said control signal and said reference frequency occurs due to departure of said interesting star image from the center of said scanner disc.

9. In a star tracker, an optical means having a restricted field of view, said optical means focusing all the light within said field of view onto a focal plane, which light may consist of an interesting star, a fainter uninteresting star, and a background light gradient, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals with substantially the same characteristics, a reference frequency reject filter connected to receive said electrical signals to provide electrical pulses of different amplitude caused by said stars and spaced at reference frequency, and free from background light gradient signals, and an amplitude clipper connected to remove the uninteresting star pulse of lesser amplitude to leave an electrical signal pulse created by said interesting star.

10. In a star tracker, an optical means having a restricted field of view, said optical means focusing all the light within said field of view onto a focal plane, which light may consist of an interesting star, a fainter uninteresting star, and a background light gradient, a source of referency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals with substantially the same characteristics, a reference frequency reject filter connected to receive said electrical signals to provide electrical pulses of different amplitude caused by said stars and spaced at reference frequency, and free from background light gradient signals, and an amplitude clipper connected to remove the uninteresting star pulse of lesser amplitude to leave an electrical signal pulse created by said interesting star, a ringer circuit of reference frequency output connected to be triggered by said interesting star pulse, and means for comparing the phase of said ringer circuit output with the phase of said reference frequency to determine the direction of departure of the image of said interesting star from the center of said scanner disc.

11. In a star tracker, an optical means having a restricted field of view, said optical means focusing all the light within said field of view onto a focal plane, which light may consist of an interesting star, a fainter uninteresting star, and a background light gradient, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon having its apex at the center of rotation of said disc, said center locating the null position of said field, said sector being orientated with respect to said reference frequency, the light from said stars being modulated by said scanner disc into periodic star light pulses recurring at said reference frequency, a photocell for converting said modulated light into electrical signals with substantially the same characteristics, a reference frequency reject filter connected to receive said electrical signals to provide electrical pulses of different amplitude caused by said stars and spaced at reference frequency, and free from background light gradient signals, and an amplitude clipper connected to remove the uninteresting star pulse of lesser amplitude to leave an electrical signal pulse created by said interesting star, a ringer circuit of reference frequency output connected to be triggered by said interesting star pulse to create a reference frequency control signal, a motor having a reference field connected to said source of reference frequency, and having a control field connected to receive said control signal, said motor being connected to move said optical means to return the image of said interesting star to the center of said scanner disc when a phase difference between said control signal and said reference frequency occurs, due to departure of said interesting star image from the center of said scanner disc.

12. In a star tracker, an optical means having a restricted field of view, said optical means focusing all the light within said field of view onto a focal plane, which light may consist of an interesting star and a fainter uninteresting star, and a background light gradient, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon of less than 180° arc and having its apex at the center of rotation of said disc, said center locating the null position of said field, said sector being orientated with respect to said reference frequency, the light from said stars being modulated by said scanner disc into periodic star light pulses recurring at said reference frequency but having important component frequencies at about $$\frac{\text{reference frequency}}{2} \times \frac{360°}{\text{sector angle}}$$

a photocell for converting said modulated light into electrical signals with substantially the same characteristics, a reference frequency reject filter connected to receive said electrical signals to provide electrical signal pulses of different amplitude caused by said stars and spaced at reference frequency and free from background light gradient signals, a narrow band pass filter for filtering out cyclical and non-cyclical frequencies other than the said frequencies at about $$\frac{\text{reference frequency}}{2} \times \frac{360°}{\text{sector angle}}$$

of said star signal pulses, and an amplitude clipper connected to remove the uninteresting star pulse of lesser amplitude and other cyclical pulses passed by said narrow band pass filter to leave a substantially clean electrical signal pulse created by said interesting star.

13. Apparatus in accordance with claim 12 wherein the arc of said sector is on the order of 10°.

14. In a star tracker, an optical means having a restricted field of view, said optical means focusing all the light within said field of view onto a focal plane, which light may consist of an interesting star and a fainter uninteresting star, and a background light gradient, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon of less than 180° and having its apex at the center of rotation of said disc, said center locating the null position of said field, said sector being orientated with respect to said reference frequency, the light from said stars being modulated by said scanner disc into periodic star light pulses recurring at said reference frequency but having important component frequencies at about $$\frac{\text{reference frequency}}{2} \times \frac{360°}{\text{sector angle}}$$

a photocell for converting said modulated light into electrical signals with substantially the same characteristics, a reference frequency reject filter connected to receive said electrical signals to provide electrical signal pulses of different amplitude caused by said stars and spaced at reference frequency and free from background light gradient signals, a narrow band pass filter for filtering out cyclical and non-cyclical frequencies other than the said frequencies at about $$\frac{\text{reference frequency}}{2} \times \frac{360°}{\text{sector angle}}$$

of said star signal pulses, and an amplitude clipper connected to remove the uninteresting star pulse of lesser amplitude and other cyclical pulses passed by said narrow band pass filter to leave a substantially clean electrical signal pulse created by said interesting star, a ringer circuit of reference frequency output connected to be triggered by said interesting star pulse, and means for comparing the phase of said ringer circuit output with the phase of said reference frequency to determine the direction of departure of said interesting star image from the center of said scanner disc.

15. Apparatus in accordance with claim 14 wherein the arc of said sector is on the order of 10°.

16. In a star tracker, an optical means having a restricted field of view, said optical means focusing all the light within said field of view onto a focal plane, which light may consist of an interesting star, and a fainter uninteresting star and a background light gradient, a source of reference frequency, a scanner disc lying in said focal plane and positioned with the center thereof intersected by the optic axis of said optical means, a scanner motor rotating said scanner disc at said reference frequency, said scanner disc having a light pulse forming sector thereon of less than 180° and having its apex at the center of rotation of said disc, said center locating the null position of said field, said sector being orientated with respect to said reference frequency, the light from said stars being modulated by said scanner disc into periodic star light pulses recurring at said reference frequency but having important component frequencies at about $$\frac{\text{reference frequency}}{2} \times \frac{360°}{\text{sector angle}}$$

a photocell for converting said modulated light into electrical signals with substantially the same characteristics, a reference frequency reject filter connected to receive said electrical signals to provide electrical signal pulses of different amplitude caused by said stars and spaced at reference frequency and free from background light gradient signals, a narrow band pass filter for filtering out cyclical and non-cyclical frequencies other than the said frequencies at about $$\frac{\text{reference frequency}}{2} \times \frac{360°}{\text{sector angle}}$$

of said star signal pulses, and an amplitude clipper connected to remove the uninteresting star pulse of lesser amplitude and other cyclical pulses passed by said narrow band pass filter to leave a substantially clean electrical signal pulse created by said interesting star, a ringer circuit of reference frequency output connected to be triggered by said interesting star pulse to create a reference frequency control signal, a motor having a reference field connected to said source of reference frequency, and having a control field connected to receive said control signal, said motor being connected to move said optical means to return the image of said interesting star to the center of said scanner disc, when a phase difference between said control signal and said reference frequency occurs due to departure of said interesting star image from the center of said scanner disc.

17. Apparatus in accordance with claim 16 wherein the arc of said sector is on the order of 10°.

References Cited in the file of this patent
UNITED STATES PATENTS

| | | |
|---|---|---|
| 2,369,622 | Toulon | Feb. 13, 1945 |
| 2,462,925 | Varian | Mar. 1, 1949 |
| 2,512,367 | Scott | July 4, 1950 |

FOREIGN PATENTS

| | | |
|---|---|---|
| 107,765 | Austria | Nov. 10, 1927 |